United States Patent
Qin et al.

(10) Patent No.: US 10,317,777 B2
(45) Date of Patent: Jun. 11, 2019

(54) AUTOMATIC ZOOMING METHOD AND APPARATUS

(71) Applicant: Huawei Technologies Co., Ltd., Shenzhen (CN)

(72) Inventors: Chao Qin, Beijing (CN); Wenmei Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 15/561,361

(22) PCT Filed: Mar. 27, 2015

(86) PCT No.: PCT/CN2015/075235
§ 371 (c)(1),
(2) Date: Sep. 25, 2017

(87) PCT Pub. No.: WO2016/154806
PCT Pub. Date: Oct. 6, 2016

(65) Prior Publication Data
US 2018/0081257 A1  Mar. 22, 2018

(51) Int. Cl.
*G03B 13/36* (2006.01)
*H04N 5/232* (2006.01)
(Continued)

(52) U.S. Cl.
CPC ............ *G03B 13/36* (2013.01); *G06T 1/0007* (2013.01); *G06T 7/13* (2017.01); *G06T 7/70* (2017.01);
(Continued)

(58) Field of Classification Search
CPC .. G03B 13/36; G06T 7/13; G06T 7/70; G06T 1/0007; G06T 2207/10148; G06T 2207/20116; H04N 5/232
See application file for complete search history.

(56) References Cited

U.S. PATENT DOCUMENTS

2013/0076944 A1* 3/2013 Kosaka ............. H04N 5/23293
348/240.2

FOREIGN PATENT DOCUMENTS

| CN | 101021604 A | 8/2007 |
| CN | 101634796 A | 1/2010 |

(Continued)

OTHER PUBLICATIONS

Machine Translation and Abstract of Chinese Publication No. CN101021604, Aug. 22, 2007, 10 pages.
(Continued)

*Primary Examiner* — Twyler L Haskins
*Assistant Examiner* — Fayez Bhuiyan
(74) *Attorney, Agent, or Firm* — Conley Rose, P.C.

(57) ABSTRACT

An automatic zooming method and an apparatus includes determining a contour of a subject of a preview image and a central point of the subject according to the preview image in a preview frame on a screen; when the central point of the subject overlaps a central point of the preview frame, determining a zoom parameter according to a size of the contour of the subject and a size of the preview frame, where the zoom parameter includes at least one of a to-be-adjusted focal length of a camera or a zoom factor of the preview image; and zooming the camera according to the zoom parameter.

19 Claims, 8 Drawing Sheets

(51) Int. Cl.

| | | |
|---|---|---|
| *H04N 5/262* | (2006.01) | |
| *G06T 7/13* | (2017.01) | |
| *G06T 7/70* | (2017.01) | |
| *G06T 1/00* | (2006.01) | |
| *G06T 7/73* | (2017.01) | |

(52) U.S. Cl.
CPC ............... *G06T 7/73* (2017.01); *H04N 5/232* (2013.01); *H04N 5/23229* (2013.01); *H04N 5/23296* (2013.01); *H04N 5/232935* (2018.08); *H04N 5/2628* (2013.01); *G06T 2207/10148* (2013.01); *G06T 2207/20116* (2013.01)

(56) References Cited

FOREIGN PATENT DOCUMENTS

| | | | |
|---|---|---|---|
| CN | 103019537 | A | 4/2013 |
| CN | 103024274 | A | 4/2013 |
| CN | 103763471 | A | 4/2014 |
| CN | 104469128 | A | 3/2015 |
| WO | 2012132277 | A1 | 10/2012 |

OTHER PUBLICATIONS

Machine Translation and Abstract of Chinese Publication No. CN101634796, Jan. 27, 2010, 13 pages.
Machine Translation and Abstract of Chinese Publication No. CN103019537, Apr. 3, 2013, 11 pages.
Machine Translation and Abstract of Chinese Publication No. CN103024274, Apr. 3, 2013, 19 pages.
Machine Translation and Abstract of Chinese Publication No. CN103763471, Apr. 30, 2014, 11 pages.
Machine Translation and Abstract of Chinese Publication No. CN104469128, Mar. 25, 2015, 13 pages.
Machine Translation and Abstract of International Publication No. WO2012132277, Oct. 4, 2012, 20 pages.
Foreign Communication From a Counterpart Application, PCT Application No. PCT/CN2015/075235, English Translation of International Search Report dated Jan. 12, 2016, 2 pages.
Foreign Communication From a Counterpart Application, PCT Application No. PCT/CN2015/075235, English Translation of Written Opinion dated Jan. 12, 2016, 7 pages.

\* cited by examiner

AUTOMATIC ZOOMING METHOD AND APPARATUS

CROSS-REFERENCE TO RELATED APPLICATIONS

This application is a national stage application of International Patent Application No. PCT/CN2015/075235, filed on Mar. 27, 2015, which is herein incorporated by reference in its entirety.

TECHNICAL FIELD

Embodiments of the present disclosure relate to image processing technologies, and in particular, to an automatic zooming method and an apparatus.

BACKGROUND

With improvement of functions of cameras of mobile phones, more users choose to use cameras of mobile phones to capture pictures. In a photographing process, how to rapidly and accurately locate a needed object is the main factor affecting user experience.

A lens zooming technology refers to changing a size, in a captured image, of a target object in a lens in a manner such as changing a focal length of the lens. Zooming manners are classified into optical zoom and digital zoom. The optical zoom is generated due to location changes of three parties, namely, a lens, an object, and a focal point. The digital zoom is to increase each pixel area in a picture by using a processor in a portable electronic device, to achieve an objective of zooming in. The portable electronic device may be a mobile terminal having a camera, a digital camera, or the like. The optical zoom is generally applied to a conventional zoom camera. A user manually changes a focal length by manually rotating a zoom ring on a lens cone. The digital zoom is mainly applied to a mobile terminal or an ordinary digital camera. A user changes a focal length by using an operating knob on a device body or by sliding on a screen with a finger.

In all existing lens zooming methods, a user needs to manually change a focal length. The user may need to perform adjustment for multiple times to reach a proper focal length. The operation is inconvenient.

SUMMARY

Embodiments of the present disclosure provide an automatic zooming method and an apparatus, so as to implement automatic zooming and help a user rapidly adjust a subject of a preview image to a proper size.

According to a first aspect, an automatic zooming method is provided, including determining a contour of a subject of a preview image and a central point of the subject according to the preview image in a preview frame on a screen; when the central point of the subject overlaps a central point of the preview frame, determining a zoom parameter according to a size of the contour of the subject and a size of the preview frame, where the zoom parameter includes at least one of a to-be-adjusted focal length of a camera or a zoom factor of the preview image; and zooming the camera according to the zoom parameter.

With reference to the first aspect, in a first possible implementation manner of the first aspect, the determining a contour of a subject of a preview image and a central point of the subject according to the preview image in a preview frame on a screen includes obtaining a characteristic parameter of the preview image; separately matching the characteristic parameter of the preview image with a characteristic parameter of at least one preset template that is stored in advance, and if the characteristic parameter of the preview image successfully matches a characteristic parameter of a first preset template in the at least one preset template, determining that a shape included in the first preset template is the subject of the preview image, where the first preset template is a preset template in the at least one preset template; and determining the contour of the subject and the central point of the subject according to the characteristic parameter of the preview image.

With reference to the first aspect, in a second possible implementation manner of the first aspect, the determining a contour of a subject of a preview image and a central point of the subject according to the preview image in a preview frame on a screen includes separately matching the characteristic parameter of the preview image with a characteristic parameter of at least one sub-image block of each preset template in at least one preset template that is stored in advance; and if the characteristic parameter of the preview image successfully matches a characteristic parameter of a first sub-image block in the at least one sub-image block of a first preset template in the at least one preset template, determining that a shape included in the first sub-image block of the first preset template is the subject of the preview image, where the first preset template is a preset template in the at least one preset template, and the first sub-image block is a sub-image block in the at least one sub-image block of the first preset template.

With reference to any one of the first aspect or the first to the second possible implementation manners of the first aspect, in a third possible implementation manner of the first aspect, before the determining a zoom parameter according to a size of the contour of the subject and a size of the preview frame, the method further includes displaying the central point of the subject and the central point of the preview frame in the preview image, and displaying prompt information, where the prompt information is used to prompt a user to move the central point of the subject to the central point of the preview frame.

With reference to any one of the first aspect or the first to third possible implementation manners of the first aspect, in a fourth possible implementation manner of the first aspect, the method further includes detecting definition of the preview image, and after the definition of the preview image meets a preset threshold, capturing a photograph of the preview image; detecting whether perspective distortion occurs in the captured photograph; and if perspective distortion occurs in the captured photograph, performing perspective correction on the captured photograph, and saving the corrected photograph.

With reference to the fourth possible implementation manner of the first aspect, in a fifth possible implementation manner of the first aspect, after the capturing a photograph of the preview image, the method further includes detecting whether the preview image is changed; and if the preview image is not changed, maintaining the zoom parameter of the camera unchanged; or if the preview image is changed, restoring the zoom parameter of the camera to an initial value.

With reference to the first or the second possible implementation manner of the first aspect, in a sixth possible implementation manner of the first aspect, the shape of the at least one preset template includes a circle, a rectangle, a triangle, a regular polygon, or an irregular polygon.

According to a second aspect, a portable electronic device is provided, including a processing module configured to determine a contour of a subject of a preview image and a central point of the subject according to the preview image in a preview frame on a screen; a determining module configured to, when the central point of the subject overlaps a central point of the preview frame, determine a zoom parameter according to a size of the contour of the subject and a size of the preview frame, where the zoom parameter includes at least one of a to-be-adjusted focal length of a camera or a zoom factor of the preview image; and a zooming module configured to zoom the camera according to the zoom parameter.

With reference to the second aspect, in a first possible implementation manner of the second aspect, the processing module is specifically configured to obtain a characteristic parameter of the preview image; separately match the characteristic parameter of the preview image with a characteristic parameter of at least one preset template that is stored in advance, and if the characteristic parameter of the preview image successfully matches a characteristic parameter of a first preset template in the at least one preset template, determine that a shape included in the first preset template is the subject of the preview image, where the first preset template is a preset template in the at least one preset template; and determine the contour of the subject and the central point of the subject according to the characteristic parameter of the preview image.

With reference to the second aspect, in a second possible implementation manner of the second aspect, the processing module is specifically configured to obtain a characteristic parameter of the preview image; separately match the characteristic parameter of the preview image with a characteristic parameter of at least one sub-image block of each preset template in at least one preset template that is stored in advance; and if the characteristic parameter of the preview image successfully matches a characteristic parameter of a first sub-image block in the at least one sub-image block of a first preset template in the at least one preset template, determine that a shape included in the first sub-image block of the first preset template is the subject of the preview image, where the first preset template is a preset template in the at least one preset template, and the first sub-image block is any sub-image block in the at least one sub-image block of the first preset template.

With reference to any one of the second aspect or the first to the second possible implementation manners of the second aspect, in a third possible implementation manner of the second aspect, the portable electronic device further includes a display module, where the display module is configured to display the central point of the subject and the central point of the preview frame in the preview image, and display prompt information, where the prompt information is used to prompt a user to move the central point of the subject to the central point of the preview frame.

With reference to any one of the second aspect or the first to the third possible implementation manners of the second aspect, in a fourth possible implementation manner of the second aspect, the portable electronic device further includes a detection module configured to detect definition of the preview image; a photographing module configured to, after the definition of the preview image meets a preset threshold, capture a photograph of the preview image, where the detection module is further configured to detect whether perspective distortion occurs in the captured photograph; and a correction module configured to, if perspective distortion occurs in the captured photograph, perform perspective correction on the captured photograph, and save the corrected photograph.

With reference to the fourth possible implementation manner of the second aspect, in a fifth possible implementation manner of the second aspect, after the photographing module captures the photograph of the preview image, the detection module is further configured to detect whether the preview image is changed; the zooming module is further configured to, if the preview image is not changed, maintain the zoom parameter of the camera unchanged; or if the preview image is changed, restore the zoom parameter of the camera to an initial value.

With reference to the first or the second possible implementation manner of the second aspect, in a sixth possible implementation manner of the second aspect, the shape of the at least one preset template includes a circle, a rectangle, a triangle, a regular polygon, or an irregular polygon.

According to a third aspect, a portable electronic device is provided, including a camera, a processor, a memory, and a system bus, where the memory and the camera are connected to the processor by using the system bus; the memory is configured to store a computer execution instruction; and the processor is configured to run the computer execution instruction, so as to execute the method in any one of the first aspect or the first to the sixth possible implementation manners of the first aspect.

According to a fourth aspect, a non-transitory computer readable medium storing one or more programs is provided, where the one or more programs include an instruction, and when the instruction is executed by a portable electronic device including a camera and multiple application programs, the portable electronic device is enabled to execute the method in any one of the first aspect or the first to the sixth possible implementation manners of the first aspect.

In the automatic zooming method and the apparatus that are provided in the embodiments of the present disclosure, a contour of a subject of a preview image and a central point of the subject are determined according to the preview image in a preview frame on a screen; when the central point of the subject overlaps a central point of the preview frame, a zoom parameter is determined according to a size of the contour of the subject and a size of the preview frame, where the zoom parameter includes at least one of a to-be-adjusted focal length of a camera or a zoom factor of the preview image; and then, the camera is zoomed according to the zoom parameter. In the method, a portable electronic device determines the zoom parameter according to the size of the contour of the subject in the preview image and the size of the preview frame, and automatically performs zooming according to the zoom parameter, helping a user rapidly adjust the subject of the preview image to a proper size.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

An automatic zooming method provided in the embodiments of the present disclosure may be applied to a portable electronic device having a camera. The portable electronic device may be any electronic device, including but not limited to a smartphone, a tablet computer, a personal digital assistant (PDA), a media player, a smart television, a camera, a video camera, or the like.

Figure 1:
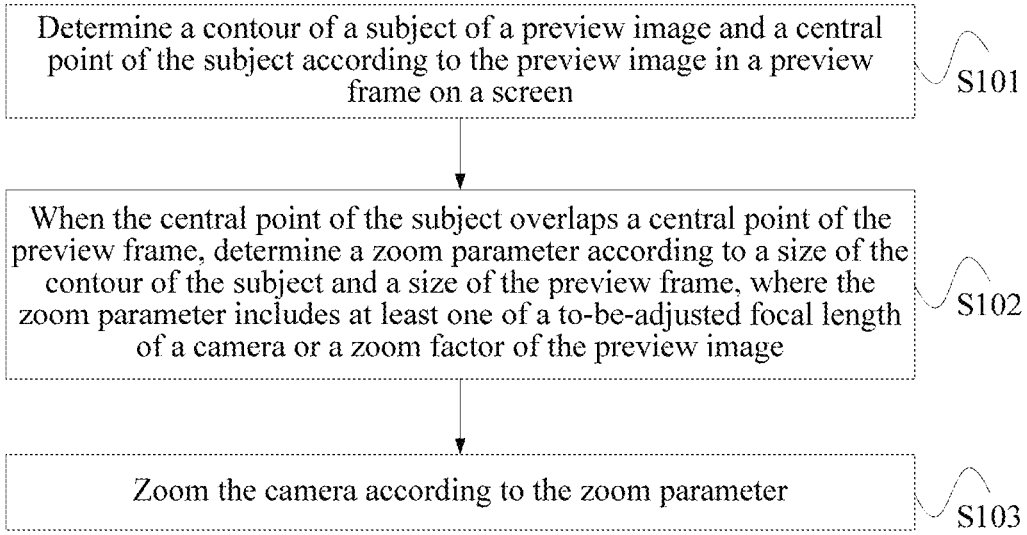
FIG. 1 is a flowchart of an automatic zooming method according to Embodiment 1 of the present disclosure.

FIG. 1 is a flowchart of an automatic zooming method according to Embodiment 1 of the present disclosure. Steps S101 to S103 are executed by the foregoing portable electronic device, and may be specifically implemented by using a module or a chip having a processing function in the foregoing portable electronic device, for example, a central processing unit (CPU). As shown in FIG. 1, the method provided in this embodiment may include the following steps.

Step S101: Determine a contour of a subject of a preview image and a central point of the subject according to the preview image in a preview frame on a screen.

A user turns on the portable electronic device. After the camera of the portable electronic device is ready, the preview image is displayed in the preview frame on the screen of the portable electronic device. A size of the preview frame may be equal to or smaller than that of the screen of the portable electronic device. This is not limited in this embodiment of the present disclosure.

When the preview image appears in the preview frame, the portable electronic device determines the subject of the preview image, and the contour and the central point of the subject. Specifically, the following manners may be used. First, obtaining, by the portable electronic device, a characteristic parameter of the preview image, then, separately matching the characteristic parameter of the preview image with a characteristic parameter of at least one preset template that is stored in advance, and if the characteristic parameter of the preview image successfully matches a characteristic parameter of a first preset template in the at least one preset template, determining that a shape included in the first preset template is the subject of the preview image. The first preset template is a preset template in the at least one preset template.

The characteristic parameter of the preview image and a characteristic parameter of a preset template include any one of the following parameters or a combination thereof a color characteristic, a shape characteristic, or a texture characteristic. The portable electronic device may specifically obtain the characteristic parameter of the preview image by using at least one of the following methods, such as, horizontal projection and/or vertical projection, an edge detection result, shape analysis, or color analysis. The preset template is prestored in the portable electronic device. A shape of the preset template may be specifically a circle, a rectangle, a triangle, a regular polygon, an irregular polygon, or the like.

In this embodiment, the central point of the subject is a central point of a circumscribed rectangle of the subject. The central point of the subject may be represented by using a circle or a rectangular frame of a proper size.

Figure 2:
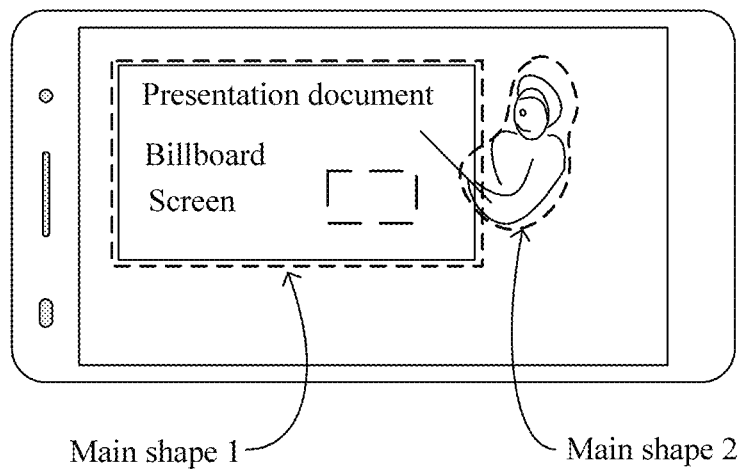
FIG. 2 is a schematic diagram of main shapes of a preview image.

In this embodiment, when the characteristic parameter of the preview image is separately matched with the characteristic parameter of the at least one preset template that is stored in advance, in an implementation manner, the characteristic parameter of the preview image is matched as a whole with the characteristic parameter of the at least one preset template. In another implementation manner, the preview image may be divided into at least one sub-image block in a preset division manner. Then, a characteristic parameter of each sub-image block is separately matched with the characteristic parameter of the at least one preset template. If a characteristic parameter of a sub-image block successfully matches the characteristic parameter of the first preset template, it is determined that the shape included in the first preset template is the subject of the preview image. Herein, the first preset template may be any preset template in the at least one preset template. For example, FIG. 2 is a schematic diagram of main shapes of the preview image. As shown in FIG. 2, there are two main shapes in total in the figure. When the characteristic parameter of the preview image is matched with the characteristic of the at least one preset template, only a preset template matching a main shape 1 is found, and no preset template matching a main shape 2 is found. Therefore, the main shape 1 is the subject of the preview image. In this embodiment, the division manner of the preview image is not limited. When the preview image is divided, multiple sub-image blocks may overlap each other.

In this embodiment, the main shape of the preview image may be a complete shape or a partial shape. When the main shape is a partial shape, it is usually because a distance to a target object corresponding to the subject is excessively small and a complete shape cannot be displayed in the preview frame, or the main shape deviates from the central point of the preview frame. Because the preset template generally has a complete shape, when the main shape of the preview image is a partial shape, if a characteristic parameter of the partial shape is directly matched with the characteristic parameter of the preset template, matching may fail. To enable the partial shape to be successfully matched, in this embodiment, each preset template of multiple preset templates may be divided into at least one sub-image block in the matching process. The characteristic parameter of the preview image is separately matched with a characteristic parameter of the at least one sub-image block of each preset template. If the characteristic parameter of the preview image successfully matches a characteristic parameter of a first sub-image block in the at least one sub-image block of a first preset template in the at least one preset template, it is determined that a shape included in the first sub-image block of the first preset template is the subject of the preview image. The first sub-image block is any sub-image block of the at least one sub-image block of the first preset template. In this embodiment, a division manner of the preset template is not limited. The division manner of the preset template may be the same as the division manner of the preview image, or may be different from the division manner of the preview image.

It should be noted that in this embodiment, the preview image and the preset template may be separately divided into multiple sub-image blocks, and then, characteristic parameters of all sub-image blocks of the preview image are separately matched with characteristic parameters of all sub-image blocks of the preset template. In addition, in this embodiment, the preview image may include multiple subjects.

Step S102: When the central point of the subject overlaps a central point of the preview frame, determine a zoom parameter according to a size of the contour of the subject and a size of the preview frame, where the zoom parameter includes at least one of a to-be-adjusted focal length of a camera or a zoom factor of the preview image.

Optionally, before determining the zoom parameter according to the size of the contour of the subject and the size of the preview frame, the portable electronic device may further display the central point of the subject and the central point of the preview frame in the preview image, and display prompt information. The prompt information is used to prompt the user to move the central point of the subject to the central point of the preview frame.

Figure 3:
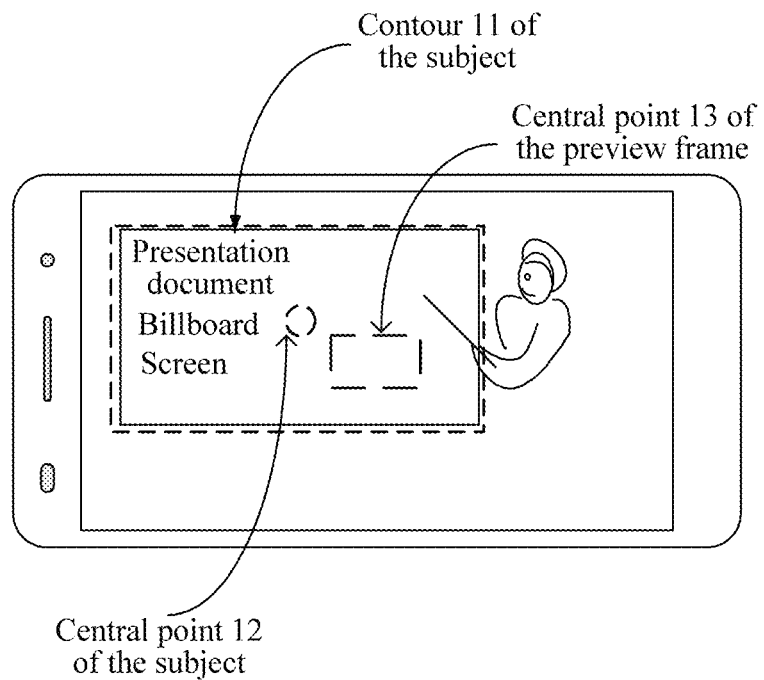
FIG. 3 is a schematic diagram of a central point of a subject and a central point of a preview frame.

FIG. 3 is a schematic diagram of a central point of a subject and a central point of a preview frame. As shown in FIG. 3, a shape identified by the larger dashed-line rectangle in FIG. 3 is a contour 11 of the subject, the dashed-line circle represents a central point 12 of a subject, and the smaller dashed-line rectangle represents a central point 13 of a preview frame. In this embodiment, the central point of the preview frame may be a central position of the preview frame, or may be a golden section point of the preview frame, or may be a strength point of a nine-rectangle-grid of the preview frame.

In this embodiment, the portable electronic device may further display the prompt information, to prompt the user to move the central point of the subject to a position overlapping the central point of the preview frame. The prompt information may be specifically a text. For example, a text "Please move the central point of the subject to the position overlapping the central point of the preview frame" is displayed on the preview image, or the prompt information is sound, and the foregoing text is broadcast to the user by means of sound, or the prompt information is a symbol, for example, the user is instructed by means of an arrow on the preview image, to move the central point of the subject to overlap the central point of the preview frame, where a starting position of the arrow is the central point of the subject, and an endpoint of the arrow is the central point of the preview frame, or the prompt information may be a combination of the foregoing three manners. This embodiment does not limit a specific implementation manner of the prompt information.

In this embodiment, if the preview image has only one subject, the user may directly move, by dragging, the central point of the subject to the position overlapping the central point of the preview frame. If the preview image has multiple subjects, the user may select one subject from the multiple subjects according to a personal need. For example, the user may select one to-be-moved subject by a click or multiple clicks on a subject. Alternatively, the portable electronic device may select one to-be-moved subject from multiple subjects. For example, the portable electronic device detects contours of multiple subjects, and selects, according to sizes of the contours of the subjects, a subject having a largest contour from the multiple subjects as the to-be-moved subject. When the sizes of the contours of the subjects are compared, areas of circumscribed rectangles of the contours of the subjects may be compared. A larger area of a circumscribed rectangle of a subject indicates a larger contour of the subject. After the to-be-moved subject is determined, the user drags a central point of the to-be-moved subject to a position overlapping the central point of the preview frame, or the portable electronic device automatically moves a central point of the to-be-moved subject to a position overlapping the central point of the preview frame.

Figure 4:
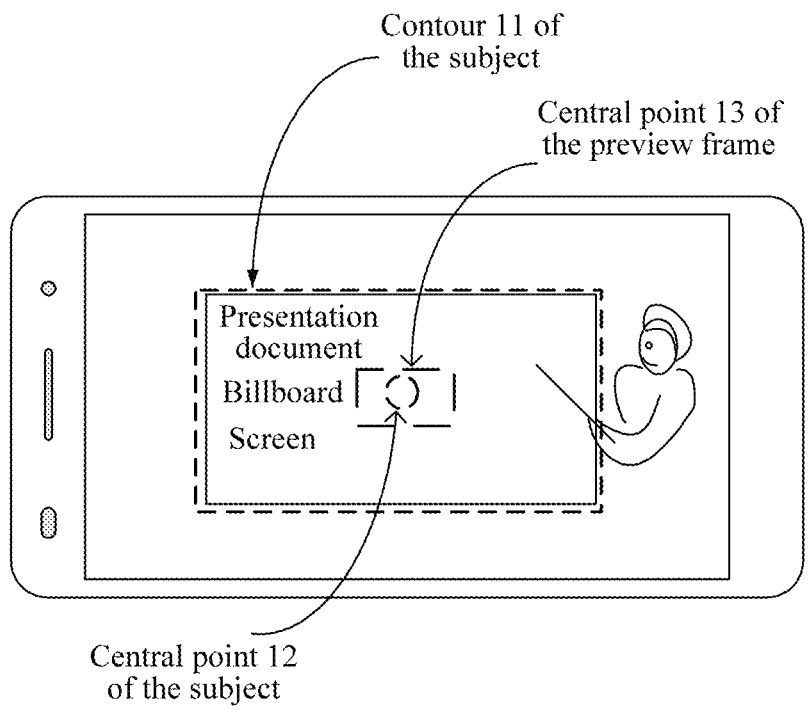
FIG. 4 is a schematic diagram after a central point of a subject is moved to a central point of a preview frame.

As shown in FIG. 4, FIG. 4 is a schematic diagram after the central point of the subject is moved to the central point of the preview frame. To implement the state shown in FIG. 4, the central point 12 of the subject needs to be moved from the position shown in FIG. 3 to the position shown in FIG. 4. In the figure, the size of the central point 12 of the subject is smaller than the size of the central point 13 of the preview frame. In a specific moving process, it may be considered that the central point 12 of the subject overlaps the central point 13 of the preview frame as long as all or a part of the central point 12 of the subject overlaps all or a part of the central point 13 of the preview frame.

After the central point of the subject overlaps the central point of the preview frame, a to-be-adjusted focal length of the camera and/or a zoom factor of the preview image is determined according to the size of the contour of the subject and the size of the preview frame. The to-be-adjusted focal length of the camera is an optical zoom parameter, and the zoom factor of the preview image is a digital zoom parameter. If the portable electronic device supports only the optical zoom, the to-be-adjusted focal length of the camera is determined according to the size of the contour of the subject and the size of the preview frame. If the portable electronic device supports only the digital zoom, the zoom factor of the preview image is determined according to the size of the contour of the subject and the size of the preview frame. If the portable electronic device supports both the optical zoom and the digital zoom, the to-be-adjusted focal length of the camera is first determined according to the size of the contour of the subject and the size of the preview frame. If the to-be-adjusted focal length cannot meet a requirement, the zoom factor of the preview image is further determined. The camera is zoomed by combining the optical zoom with the digital zoom.

The to-be-adjusted focal length of the camera may be calculated in the following manner. First, determining, according to the size of the contour of the subject, an image length l of the subject before zooming, determining, according to the size of the preview frame, an image length l of the subject after zooming, and then, calculating an object distance of the camera according to a lens imaging formula.

$$\frac{1}{f} = \frac{1}{u} + \frac{1}{v},$$

where l represents an object length, u represents an object distance, and v represents an image distance. In this embodiment, a focal length f of the camera and the image distance v of the subject are known. By substituting the focal length f and the image distance v into the lens imaging formula, the object distance u=fv(v−f) may be obtained. Then, an object length l of a target object corresponding to the subject is determined according to the image length l of the subject, the object distance u, and the image distance v before zooming, where $$l = \frac{l'u}{v}.$$

Figure 5:
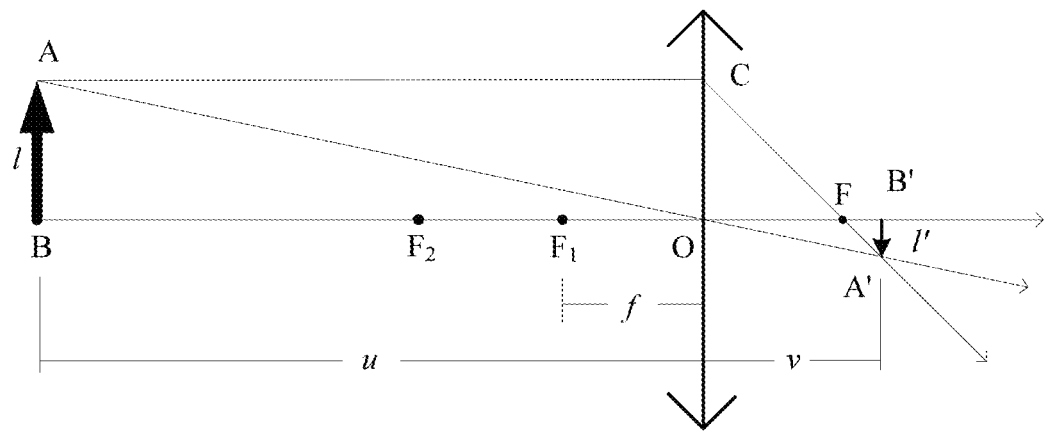
FIG. 5 is a schematic diagram of lens imaging before zooming.
Figure 6:
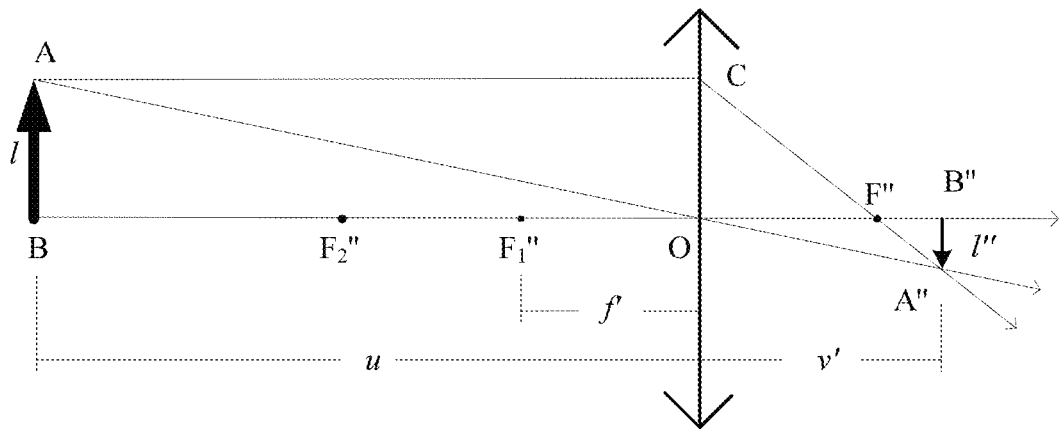
FIG. 6 is a schematic diagram of lens imaging after zooming.

FIG. 5 is a schematic diagram of lens imaging before zooming, and FIG. 6 is a schematic diagram of lens imaging after zooming. Referring to FIG. 5 and FIG. 6, O is a central point of a coordinate system, F1 represents a position of one multiple of the focal length, F2 represents a position of two multiples of the focal length, AB represents the object length of the target object corresponding to the subject, and A"B" represents the image length of the subject after zooming. The camera is not moved or is slightly moved before and after zooming. Therefore, it may be considered that the object distance u of the camera does not change before and after zooming. It is set that φ is ∠AOB, where φ=φ'=a tan(l'/v). The object length l of the target object and φ do not change either before and after zooming. The image distance after zooming is v", where v"=l"atan φ. It may be obtained that f"=lv"(l+l") according to that ΔCF"O is similar to ΔA"B"F", where f" is the to-be-adjusted focal length of the camera.

Optionally, in the process of calculating the to-be-adjusted focal length, the object distance may also be obtained through measurement by using an infrared sensor, an ultrasonic sensor, or a laser sensor.

In the examples shown in FIG. 5 and FIG. 6, the focal length of the camera is increased. Certainly, the focal length may be decreased.

The digital zoom refers to zooming the preview image. Calculation may be specifically performed in the following manner. First, determining an actual horizontal maximum length a and an actual vertical maximum length b of the subject, where specifically, a circumscribed rectangle of the subject may be first determined, a length of the circumscribed rectangle is the actual horizontal maximum length a of the subject, and a width of the circumscribed rectangle is the actual vertical maximum length b of the subject; then, determining a to-be-adjusted horizontal maximum length a' and a to-be-adjusted vertical maximum length b' of the subject according to the size of the preview frame, where the to-be-adjusted horizontal maximum length a' is less than or equal to a horizontal length of the preview frame, and the to-be-adjusted vertical maximum length b' is less than or equal to a vertical length of the preview frame; and finally, calculating a ratio c between the horizontal lengths. c=a'/a and a ratio d between the vertical lengths. d=b'/b, and comparing the ratio between the horizontal lengths with the ratio between the vertical lengths, where if c≤d, the zoom factor of the preview image is c, and if c>d, the zoom factor of the preview image is d. When the zoom factor is less than 1, it indicates that the preview image is zoomed out. When the zoom factor is equal to 1, it indicates that the preview image does not need to be adjusted. When the zoom factor is greater than 1, it indicates that the preview image is zoomed in.

Figure 7:
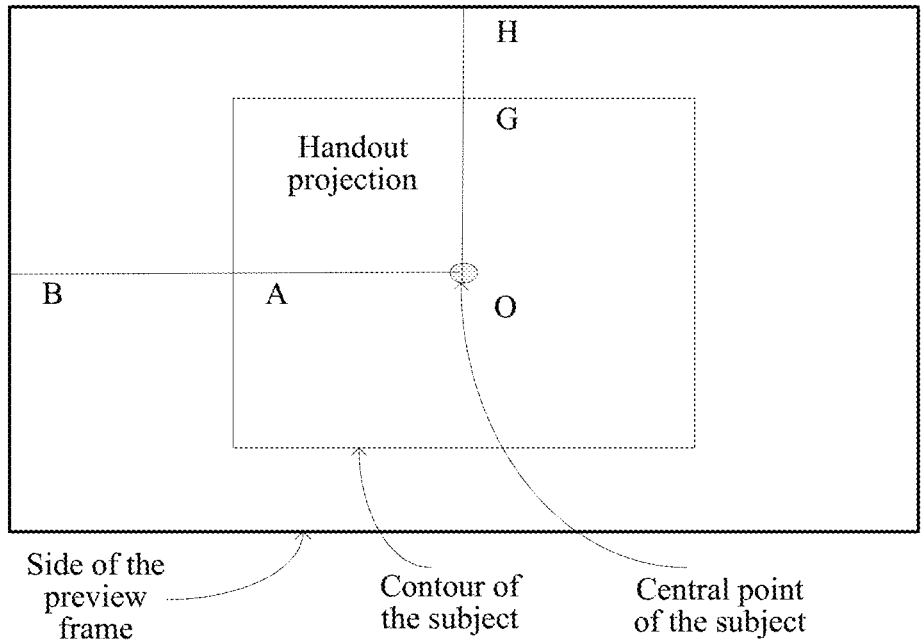
FIG. 7 is a schematic diagram of digital zoom according to an embodiment of the present disclosure.
Figure 8:
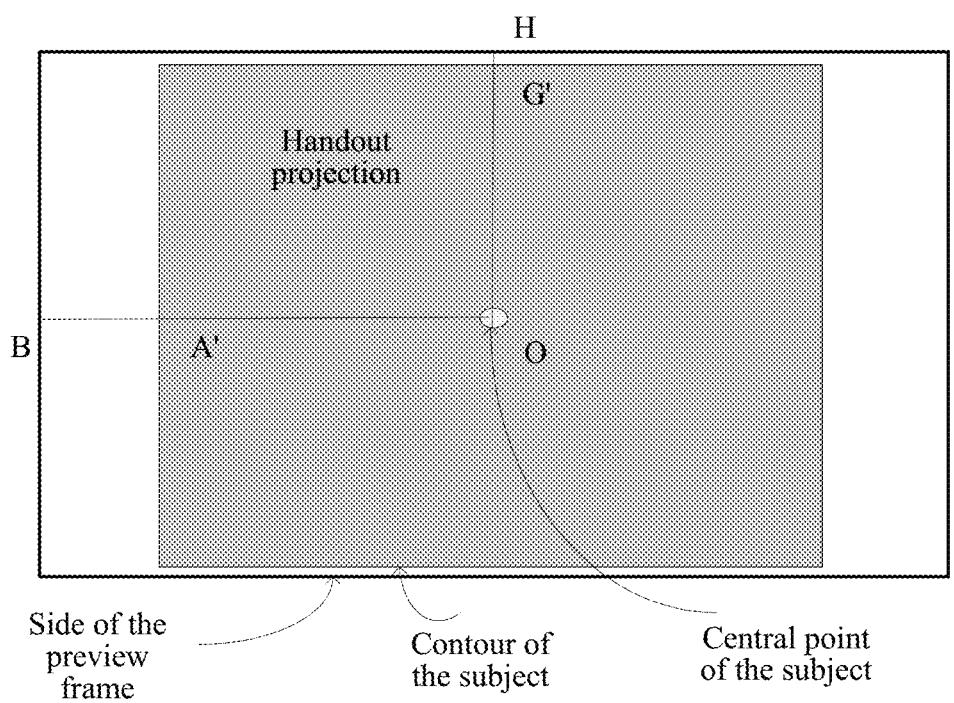
FIG. 8 is a schematic diagram of a preview image after digital zoom.

FIG. 7 is a schematic diagram of digital zoom according to an embodiment of the present disclosure. As shown in FIG. 7, the point O represents the central point of the subject of the preview image, and the central point of the subject is also the central point of the preview frame, that is, the central point of the subject overlaps the central point of the preview frame. The smaller rectangle in the figure represents the subject. An actual horizontal maximum length of the subject is OA, and an actual vertical maximum length of the subject is OG. In this embodiment, assuming that an edge of the subject needs to be zoomed in to be close against an edge of the preview frame, a to-be-adjusted horizontal maximum length is OB, where OB is a distance from the central point of the subject to a vertical boundary of the preview frame, and a to-be-adjusted vertical maximum length is OH, where OB is a distance from the central point of the subject to a horizontal boundary of the preview frame. Therefore, c=OB/OA=1.9, d=OH/OG=1.5, and the zoom factor of the preview image is 1.5. The preview image obtained after zooming in is shown in FIG. 8. FIG. 8 is a schematic diagram of the preview image obtained after digital zoom.

Step S103: Zoom the camera according to the zoom parameter.

The subject of the preview image is adjusted to a proper size by means of the optical zoom and/or the digital zoom.

In this embodiment, a contour of a subject of a preview image and a central point of the subject are determined according to the preview image in a preview frame on a screen; when the central point of the subject overlaps a central point of the preview frame, a zoom parameter is determined according to a size of the contour of the subject and a size of the preview frame. The zoom parameter includes at least one of a to-be-adjusted focal length of a camera or a zoom factor of the preview image; and then, the camera is zoomed according to the zoom parameter. In the method, a portable electronic device determines the zoom parameter according to the size of the contour of the subject in the preview image and the size of the preview frame, and automatically performs zooming according to the zoom parameter, helping a user rapidly adjust the subject to a proper size.

Figure 9:
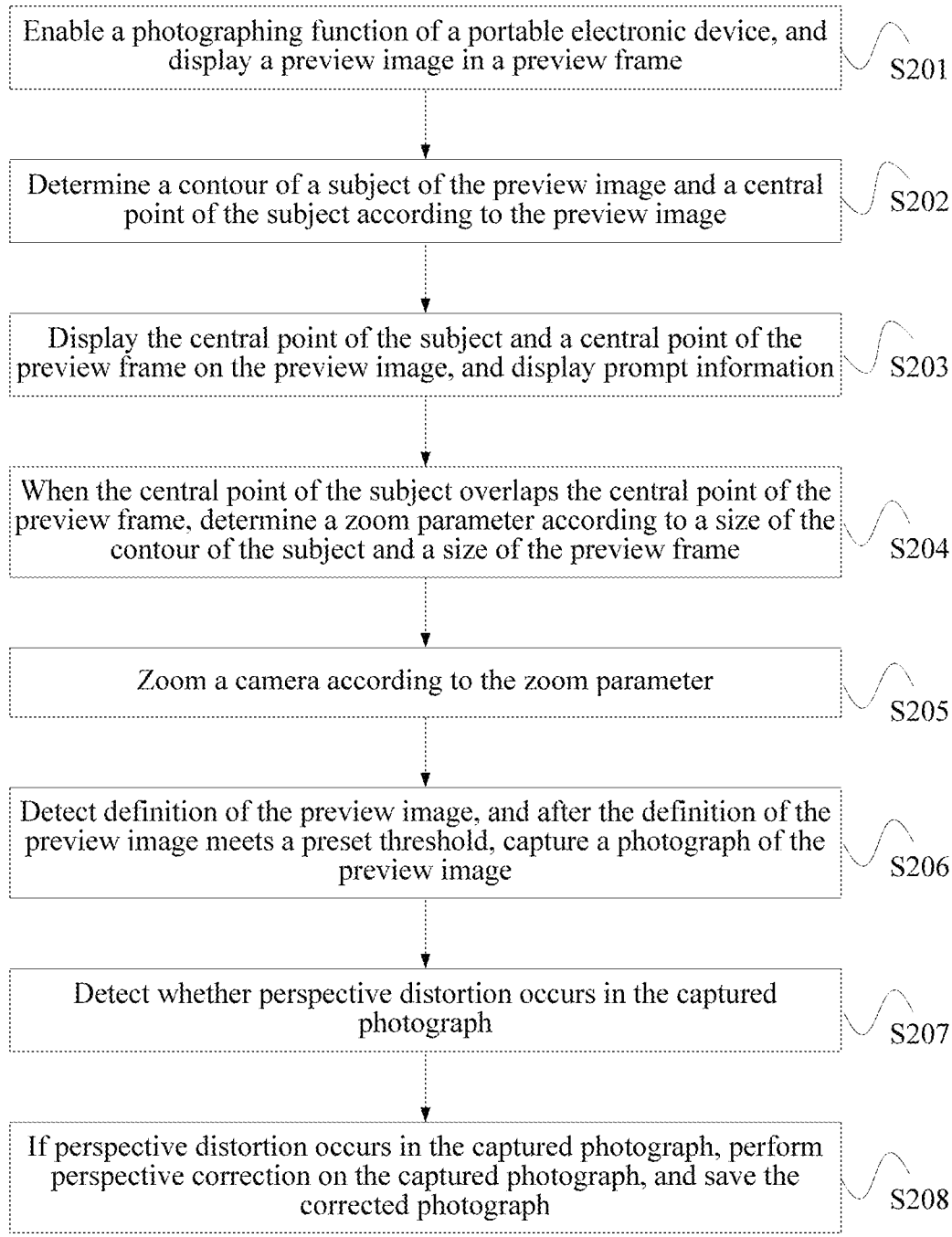
FIG. 9 is a flowchart of an automatic zooming method according to Embodiment 2 of the present disclosure.

FIG. 9 is a flowchart of an automatic zooming method according to Embodiment 2 of the present disclosure. Steps S201 to S208 are executed by the foregoing portable electronic device, and may be specifically implemented by using a module or a chip having a processing function in the foregoing portable electronic device, for example, a CPU. As shown in FIG. 9, the method provided in this embodiment may include the following steps.

Step S201: Enable a photographing function of the portable electronic device, and display a preview image in a preview frame.

Step S202: Determine a contour of a subject of the preview image and a central point of the subject according to the preview image.

Step S203: Display the central point of the subject and a central point of the preview frame on the preview image, and display prompt information.

Step S204: When the central point of the subject overlaps the central point of the preview frame, determine a zoom parameter according to a size of the contour of the subject and a size of the preview frame.

The zoom parameter includes at least one of a to-be-adjusted focal length of a camera or a zoom factor of the preview image.

Step S205: Zoom the camera according to the zoom parameter.

For specific implementation manners of steps S201 to S205, refer to related descriptions in Embodiment 1. Details are not described herein again.

Step S206: Detect definition of the preview image, and after the definition of the preview image meets a preset threshold, capture a photograph of the preview image.

After the subject of the preview image is adjusted to a proper size, the portable electronic device detects the definition of the preview image. After the preview image meets a definition requirement, a photograph of the preview image is automatically captured.

Step S207: Detect whether perspective distortion occurs in the captured photograph.

Step S208: If perspective distortion occurs in the captured photograph, perform perspective correction on the captured photograph, and save the corrected photograph.

The perspective correction is also referred to as perspective control, which is a process of synthesizing or editing a photograph, so as to obtain a result conforming to the understanding on perspective distortion of the public. The perspective correction is a plane geometric transformation on an image. A relatively common method includes a perspective transformation method and a control point transformation method. In the perspective transformation method, image correction is mainly implemented according to an imaging principle of a video camera. The control point transformation method is applied to general image correction, and a principle is to implement correction of an image according to a correspondence between control points by using a bilinear interpolation method. A common expression of bilinear space transformation is u=Ax+By+Cxy+D, and v=Ex+Fy+Gxy+H, where A, B, C, D, E, F, G, and H are eight parameters transformed from an xy space to a uv space. A transformation parameter may be solved as long as four pairs of points (any three points are not collinear) before and after transformation are known. A point in a rectangle may be calculated according to an interpolation algorithm.

Figure 10:
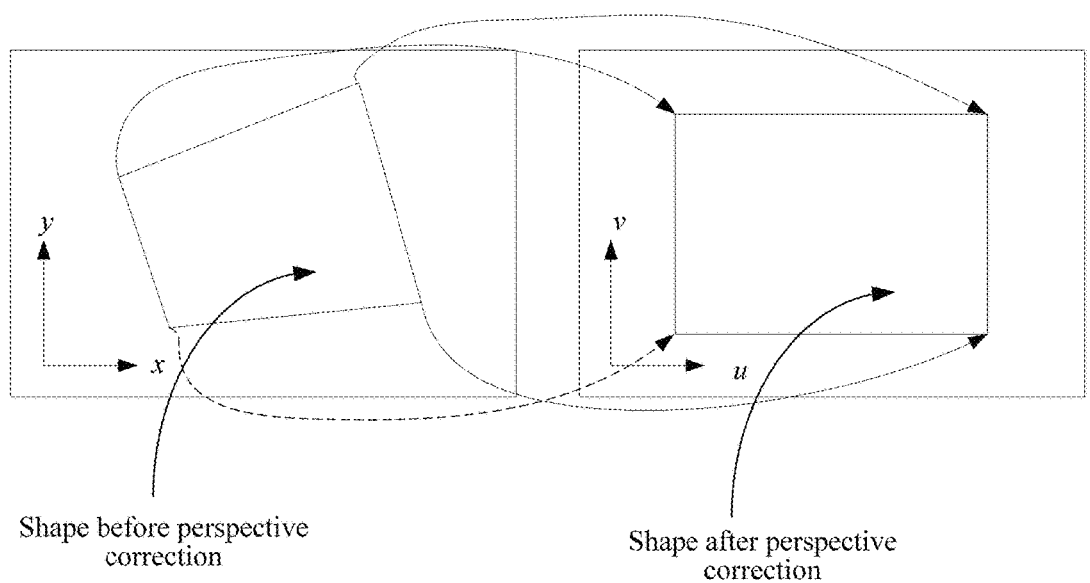
FIG. 10 is a schematic diagram of comparison of shapes before and after perspective correction.

A correction process includes all vertical lines in reality may be displayed in a vertical direction in an image by means of perspective correction. These vertical lines include a column, a vertical side of a wall, a lamppost, and the like. This is the understanding of the perspective result widely accepted by the public. A basis of such a perspective result is that the farther an object is, the smaller it is in an image. As shown in FIG. 10, FIG. 10 is a schematic diagram of comparison of shapes before and after perspective correction. Because of the existence of a distance in the vertical direction, a distance from the top of a building to an observer on the ground is greater than a distance from a base to the observer on the ground. However, generally, in a process of establishing a perspective, only a distance in the horizontal direction is considered, while the distance in the vertical direction is not considered. That is, it is considered that the distance from the top of the building to the observer on the ground is the same as the distance from the base to the observer on the ground. For example, in a quadrate room, parallel lines such as four horizontal sides intersect at one point.

Figure 11:
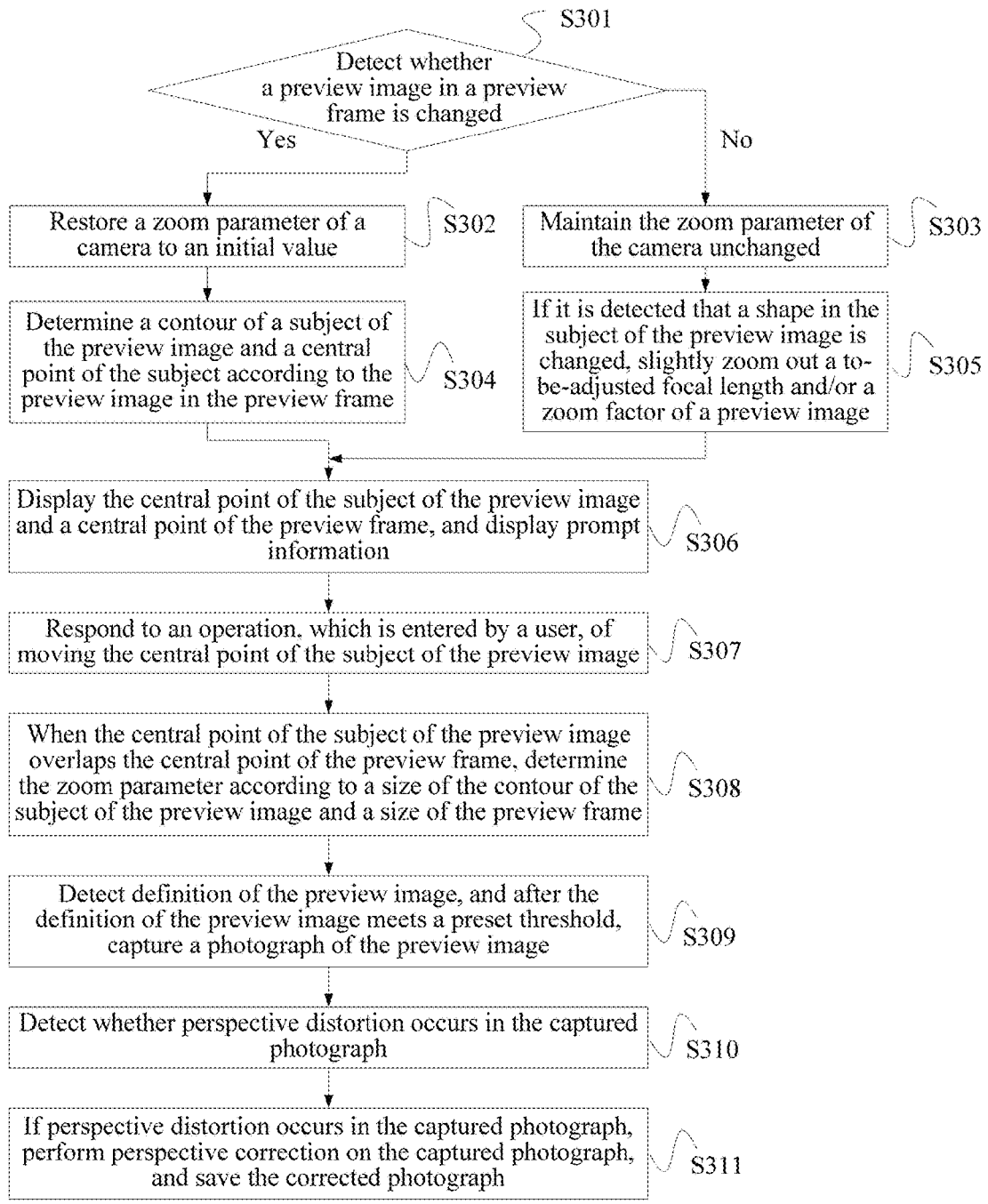
FIG. 11 is a flowchart of an automatic zooming method according to Embodiment 3 of the present disclosure.

Based on Embodiment 1 and Embodiment 2, a scenario of this embodiment is a method for zooming a camera in a process of continuing to photograph after a user finishes a first stage of photographing. FIG. 11 is a flowchart of an automatic zooming method according to Embodiment 3 of the present disclosure. S301 to S311 are executed by the foregoing portable electronic device. As shown in FIG. 11, the method provided in this embodiment may include the following steps.

Step S301: Detect whether a preview image in a preview frame is changed.

After previous photographing, the camera maintains an enabled state. If the portable electronic device is moved or a target object is moved, the preview image may be changed. In this embodiment, the portable electronic device detects whether the preview image in the preview frame is changed. If the preview image is changed, step S302 is performed. If the preview image is not changed, step S303 is performed. It should be noted that in this embodiment, that the preview image is not changed does not refer to that a preview image in the preview frame at a previous photographing stage is completely the same as the preview image in the preview frame at a current photographing stage, but refers to that a photographing scenario in the preview frame at the two photographing stages is not changed, and the preview images in the preview frame at the two photographing stages are not greatly changed but are only slightly moved.

Step S302: Restore a zoom parameter of a camera to an initial value.

If the preview image is changed, S302 is performed. That the preview image is changed indicates that the photographing scenario is changed. In this case, the zoom parameter of the camera is restored to the initial value. A parameter at a next photographing stage is re-adjusted.

Step S303: Maintain the zoom parameter of the camera unchanged.

If the preview image is not changed, S303 is performed. That the preview image is not changed indicates that a subject of the preview image is also not changed. There is no need to re-determine the zoom parameter for the subject. Therefore, the zoom parameter is maintained unchanged.

Step S304: Determine a contour of a subject of the preview image and a central point of the subject according to the preview image in the preview frame.

After step S302 is performed, step S304 is performed.

Step S305: If it is detected that a shape in the subject of the preview image is changed, slightly decrease a to-be-adjusted focal length and/or a zoom factor of the preview image.

An objective of this step is to prevent the subject of the preview image from moving out of the preview frame due to slight movement of the portable electronic device. If the subject of the preview image is zoomed in to an edge of the preview frame at the previous photographing stage, the subject of the preview image is very easily to be moved out of the preview frame. In this embodiment, the to-be-adjusted focal length and/or the zoom factor of the preview image are slightly decreased, so that the subject of the preview image may be zoomed out. In this case, even if the portable electronic device is slightly moved, the subject of the preview image will not be moved out of the preview frame.

After step S303 is performed, step S305 is performed.

Step S306: Display the central point of the subject of the preview image and a central point of the preview frame, and display prompt information.

Step S307: Respond to an operation, which is entered by a user, of moving the central point of the subject of the preview image.

Step S308: When the central point of the subject of the preview image overlaps the central point of the preview frame, determine the zoom parameter according to a size of the contour of the subject of the preview image and a size of the preview frame.

For specific implementation manners of steps S304 to S308, refer to related descriptions in Embodiment 1. Details are not described herein again.

Step S309: Detect definition of the preview image, and after the definition of the preview image meets a preset threshold, capture a photograph of the preview image.

Step S310: Detect whether perspective distortion occurs in the captured photograph.

Step S311: If perspective distortion occurs in the captured photograph, perform perspective correction on the captured photograph, and save the corrected photograph.

For specific implementation manners of steps S309 to S311, refer to related descriptions in Embodiment 2. Details are not described herein again.

Figure 12:
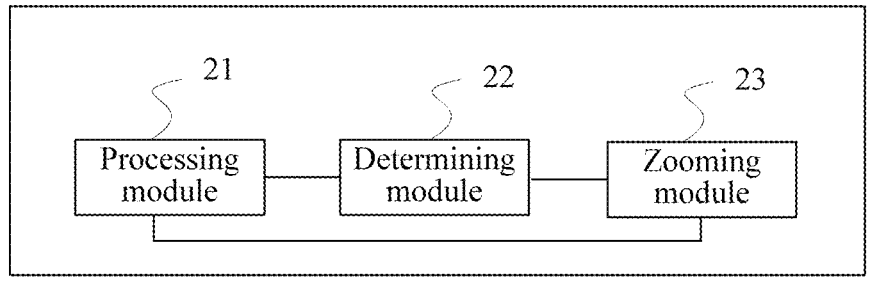
FIG. 12 is a schematic structural diagram of a portable electronic device according to Embodiment 4 of the present disclosure.

FIG. 12 is a schematic structural diagram of a portable electronic device according to Embodiment 4 of the present disclosure. As shown in FIG. 12, the portable electronic device provided in this embodiment includes a processing module 21, a determining module 22, and a zooming module 23.

The processing module 21 is configured to determine a contour of a subject of a preview image and a central point of the subject according to the preview image in a preview frame on a screen.

The determining module 22 is configured to, when the central point of the subject overlaps a central point of the preview frame, determine a zoom parameter according to a size of the contour of the subject and a size of the preview frame. The zoom parameter includes at least one of a to-be-adjusted focal length of a camera or a zoom factor of the preview image.

The zooming module 23 is configured to zoom the camera according to the zoom parameter.

Optionally, the processing module 21 is specifically configured to obtain a characteristic parameter of the preview image; separately match the characteristic parameter of the preview image with a characteristic parameter of at least one preset template that is stored in advance, and if the characteristic parameter of the preview image successfully matches a characteristic parameter of a first preset template in the at least one preset template, determine that a shape included in the first preset template is the subject of the preview image. The first preset template is a preset template in the at least one preset template; and determine the contour of the subject and the central point of the subject according to the characteristic parameter of the preview image.

Optionally, the processing module 21 is specifically configured to obtain a characteristic parameter of the preview image; separately match the characteristic parameter of the preview image with a characteristic parameter of at least one sub-image block of each preset template in at least one preset template that is stored in advance; and if the characteristic parameter of the preview image successfully matches a characteristic parameter of a first sub-image block in the at least one sub-image block of a first preset template, determine that a shape included in the first sub-image block of the first preset template is the subject of the preview image. The first preset template is a preset template in the at least one preset template, and the first sub-image block is a sub-image block in the at least one sub-image block of the first preset template.

Optionally, the shape of the at least one preset template includes a circle, a rectangle, a triangle, a regular polygon, or an irregular polygon.

Figure 13:
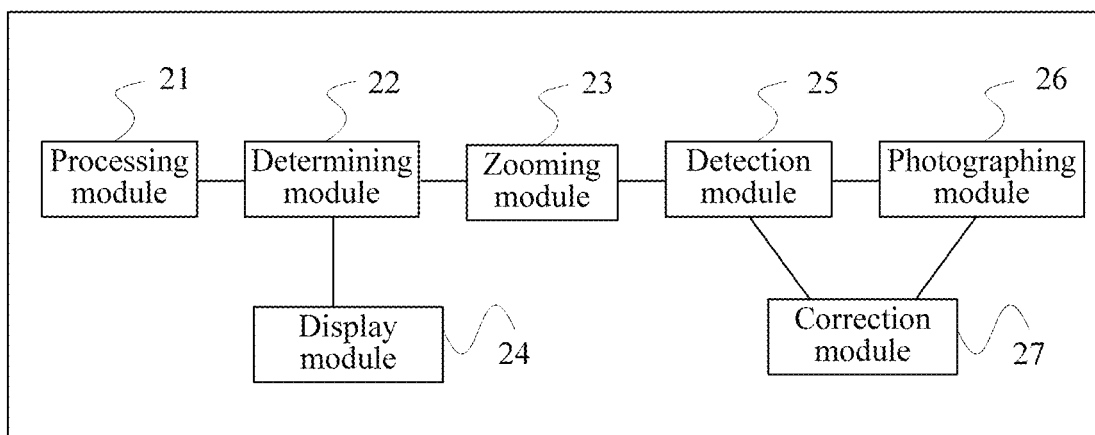
FIG. 13 is a schematic structural diagram of another portable electronic device according to Embodiment 4 of the present disclosure.

FIG. 13 is a schematic structural diagram of another portable electronic device according to Embodiment 4 of the present disclosure. Based on the portable electronic device shown in FIG. 12, the portable electronic device further includes a display module 24, a detection module 25, a photographing module 26, and a correction module 27.

The display module 24 is configured to display the central point of the subject and the central point of the preview frame in the preview image, and display prompt information. The prompt information is used to prompt a user to move the central point of the subject to the central point of the preview frame.

The detection module 25 is configured to detect definition of the preview image.

The photographing module 26 is configured to, after the definition of the preview image meets a preset threshold, capture a photograph of the preview image.

The detection module 25 is further configured to detect whether perspective distortion occurs in the captured photograph.

The correction module 27 is configured to, if perspective distortion occurs in the captured photograph, perform perspective correction on the captured photograph, and save the corrected photograph.

Optionally, after the photographing module 25 captures the photograph of the preview image, the detection module 25 is further configured to detect whether the preview image is changed. Correspondingly, the zooming module 23 is further configured to, if the preview image is not changed, maintain the zoom parameter of the camera unchanged; or if the preview image is changed, restore the zoom parameter of the camera to an initial value.

The portable electronic device provided in Embodiment 4 may be configured to execute the methods in Embodiment 1 to Embodiment 3, and has a similar specific implementation manner and technical effect. Details are not described herein again.

Figure 14:
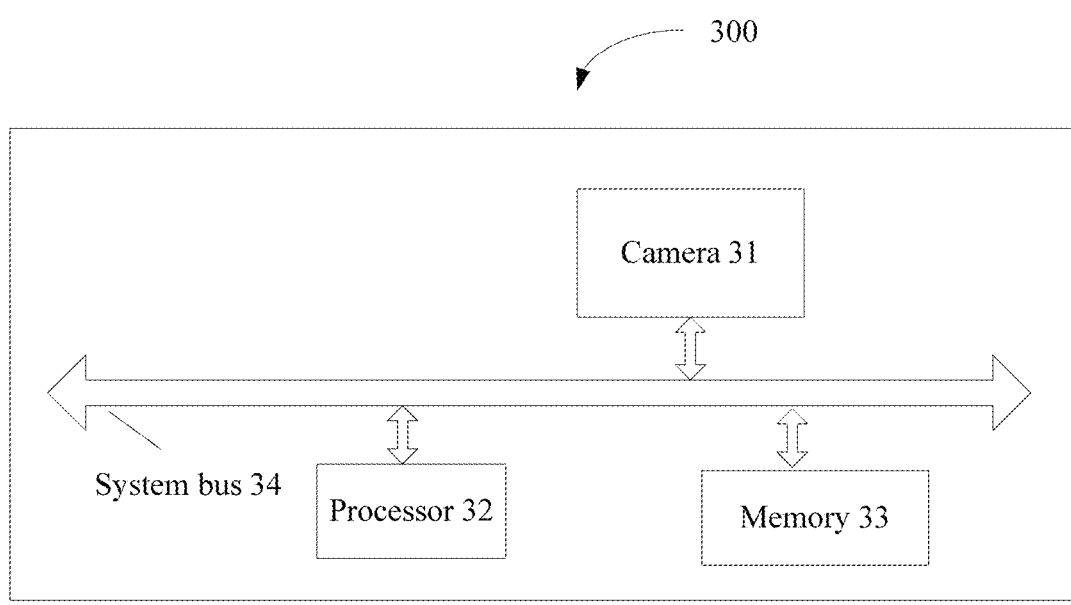
FIG. 14 is a schematic structural diagram of a portable electronic device according to Embodiment 5 of the present disclosure.

FIG. 14 is a schematic structural diagram of a portable electronic device according to Embodiment 5 of the present disclosure. The portable electronic device 300 provided in Embodiment 5 may be configured to implement the methods in Embodiment 1 to Embodiment 3 of the present disclosure. For ease of description, only a part related to this embodiment of the present disclosure is shown. For unrevealed technical details, refer to descriptions of Method Embodiment 1 to Method Embodiment 3 of the present disclosure. As shown in FIG. 14, the portable electronic device provided in this embodiment includes a camera 31, a processor 32, a memory 33, and a system bus 34. The memory 33 and the camera 31 are connected to the processor 32 by using the system bus 34.

The camera 31 is configured to collect a preview image, and transmit the collected preview image to the processor 32.

The processor 32 is a control center of the portable electronic device, connects parts of the entire portable electronic device by using various interfaces and circuits, and executes various functions of the portable electronic device and/or processes data by running or executing a software program and/or a module stored in the memory 33 and by invoking data stored in the memory 33. The processor 32 may include an integrated circuit (IC), for example, may include a single packaged IC, or may include multiple connected packaged ICs that have same functions or different functions. For example, the processor 32 may include only a CPU, or may be a combination of a graphics processing unit (GPU), a digital signal processor (DSP), and a control chip (for example, a baseband chip) in a communications unit.

The memory 33 may be configured to store a software program and a module. The processor 32 runs the software program and the module that are stored in the memory 33, to execute various functional applications of the portable electronic device and implement data processing. The memory 33 mainly includes a program storage area and a data storage area. The program storage area may store an operating system and an application program required by at least one function, such as a sound play program and an image display program. The data storage area may store data (such as audio data and an address book) created according to use of the portable electronic device and the like. In a specific implementation manner of the present disclosure, the storage unit may include a volatile memory, for example, a nonvolatile random access memory (NVRAM), a phase change random access memory (PRAM), and a magnetoresistive random access memory (MRAM), and may further include a nonvolatile memory, for example, at least one magnetic disk storage, an electrically erasable programmable read-only memory (EEPROM), and a flash component, for example, a negative-OR (NOR) flash memory or a negative-AND (NAND) flash memory. The nonvolatile memory stores an operating system and an application program that are executed by the processor 32. The processor 32 loads a running program and data from the nonvolatile memory to a memory, and stores digital content in a large scale storage apparatus. The operating system is used for control and management of regular system tasks, such as memory management, storage device control, and power management, and various components and/or drivers that facilitate communication between various types of software and hardware. In an implementation manner of the present disclosure, the operating system may be the Android® system of the Google® company, the iOS® system developed by the Apple® company, or the Windows® operating system developed by the Microsoft® company, or may be a built-in operating system such as Vxworks developed by Wind River Systems. The application program includes any application installed on the portable electronic device, including but not limited to a browser, an email, an instant messaging service, text processing, keyboard virtualization, a window widget, encryption, digital copyright management, speech recognition, speech replication, positioning (for example, a function provided by the Global Positioning System), music playing, and the like.

A person skilled in the art may understand that a portable electronic device structure shown in FIG. 14 constitutes no limitation to an electronic device, and the portable electronic device may include more or fewer components than those shown in the figure, or some components may be combined, or a different component deployment may be used. Though not shown, the portable electronic device 300 may further include components such as a touchscreen, a power source, a radio frequency (RF) circuit, a wireless fidelity (Wi-Fi) module, an audio circuit, and a sensor. Details are not described herein.

In this embodiment, the processor 32 is specifically configured to execute the following operations such as determining a contour of a subject of a preview image and a central point of the subject according to the preview image in a preview frame on a screen; when the central point of the subject overlaps a central point of the preview frame, determining a zoom parameter according to a size of the contour of the subject and a size of the preview frame, where the zoom parameter includes at least one of a to-be-adjusted focal length of a camera or a zoom factor of the preview image; and zooming the camera according to the zoom parameter.

Optionally, the determining a contour of a subject of a preview image and a central point of the subject according to the preview image in a preview frame on a screen includes obtaining a characteristic parameter of the preview image; separately matching the characteristic parameter of the preview image with a characteristic parameter of at least one preset template that is stored in advance, and if the characteristic parameter of the preview image successfully matches a characteristic parameter of a first preset template in the at least one preset template, determining that a shape included in the first preset template is the subject of the preview image. The first preset template is a preset template in the at least one preset template; and determining the contour of the subject and the central point of the subject according to the characteristic parameter of the preview image.

Optionally, the determining a contour of a subject of a preview image and a central point of the subject according to the preview image in a preview frame on a screen includes obtaining a characteristic parameter of the preview image; separately matching the characteristic parameter of the preview image with a characteristic parameter of at least one sub-image block of each preset template in at least one preset template that is stored in advance; and if the characteristic parameter of the preview image successfully matches a characteristic parameter of a first sub-image block in the at least one sub-image block of a first preset template in the at least one preset template, determining that a shape included in the first sub-image block of the first preset template is the subject of the preview image. The first preset template is a preset template in the at least one preset template, and the first sub-image block is a sub-image block in the at least one sub-image block of the first preset template.

Optionally, before determining the zoom parameter according to the size of the contour of the subject and the size of the preview frame, the processor 32 is further configured to display the central point of the subject and the central point of the preview frame in the preview image, and display prompt information. The prompt information is used to prompt the user to move the central point of the subject to the central point of the preview frame.

Optionally, the processor 32 is further configured to detect definition of the preview image, and after the definition of the preview image meets a preset threshold, capture a photograph of the preview image; detect whether perspective distortion occurs in the captured photograph; and if perspective distortion occurs in the captured photograph, perform perspective correction on the captured photograph, and save the corrected photograph.

Optionally, after capturing the photograph of the preview image capture, the processor 32 is further configured to detect whether the preview image is changed; if the preview image is not changed, maintain the zoom parameter of the camera unchanged; or if the preview image is changed, restore the zoom parameter of the camera to an initial value.

In this embodiment, the shape of the at least one preset template includes a circle, a rectangle, a triangle, a regular polygon, or an irregular polygon.

Embodiment 7 of the present disclosure provides a non-transitory computer readable medium storing one or more programs. The one or more programs include an instruction, when the instruction is executed by a portable electronic device including a camera and multiple application programs, the portable electronic device is enabled to execute the operations in S101 to S103 in the method in Embodiment 1; or all or some of the operations in S201 to S208 in the method in Embodiment 2; or all or some of the operations in S301 to S311 in the method in Embodiment 3.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An automatic zooming method, comprising:
    determining a contour of a subject of a preview image in a preview frame on a screen of an electronic device;
    determining a central point of the subject of the preview image;
    determining a zoom parameter according to a size of the contour of the subject of the preview image and a size of the preview frame when the central point of the subject of the preview image overlaps a central point of the preview frame, the zoom parameter comprising at least one of a to-be-adjusted focal length of a lens of a camera of the electronic device or a zoom factor of the preview image;
    zooming the camera according to the zoom parameter;
    detecting a definition of the preview image;
    capturing a photograph of the preview image when the definition of the preview image meets a preset threshold;
    detecting whether the photograph of the preview image includes perspective distortion;
    performing perspective correction on the photograph of the preview image when the photograph of the preview image includes perspective distortion; and
    saving the photograph of the preview image with the perspective correction.

2. The method of claim 1, wherein determining the contour of the subject of the preview image and the central point of the subject of the preview image in the preview frame on the screen comprises:
    obtaining a first characteristic parameter of the preview image;
    separately matching the first characteristic parameter of the preview image with a second characteristic parameter in at least one preset template that is prestored;
    determining shape comprised in a first preset template of the at least one preset template is a shape of the subject of the preview image when the first characteristic parameter of the preview image matches the second characteristic parameter in the at least one preset template; and
    determining the contour of the subject and the central point of the subject according to the first characteristic parameter of the preview image.

3. The method of claim 1, wherein determining the contour of the subject of the preview image and the central point of the subject according to the preview image in the preview frame on the screen comprises:
    obtaining a first characteristic parameter of the preview image;
    separately matching the first characteristic parameter of the preview image with a second characteristic parameter of at least one sub-image block in at least one preset template that is prestored; and
    determining that a shape comprised in a first sub-image block of a first preset template of the at least one preset template is a shape of the subject of the preview image when the first characteristic parameter of the preview image matches the second characteristic parameter of the at least one sub-image block in the at least one preset template, and the first sub-image block being a sub-image block in the at least one sub-image block of the first preset template.

4. The method of claim 1, wherein before determining the zoom parameter according to the size of the contour of the subject and the size of the preview frame, the method further comprises:
    displaying the central point of the subject and the central point of the preview frame in the preview image; and
    displaying prompt information, the prompt information comprising instructions to move the central point of the subject to the central point of the preview frame.

5. The method of claim 1, wherein after capturing the photograph of the preview image, the method further comprises:
    detecting whether the preview image is changed;
    maintaining the zoom parameter of the camera to be unchanged when the preview image is not changed; and
    restoring the zoom parameter of the camera to an initial value when the preview image is changed.

6. The method of claim 2, wherein the shape of the first preset template is a circle, a rectangle, a triangle, a regular polygon, or an irregular polygon.

7. A portable electronic device, comprising:
    a display comprising a touch-sensitive surface and a display screen;
    a memory comprising instructions; and
    a processor coupled to the memory and the display, the processor being configured to execute the instructions, the instructions causing the processor to be configured to:
        determine a contour of a subject of a preview image in a preview frame on the display screen;
        determine a central point of the subject of the preview image;
        determine a zoom parameter according to a size of the contour of the subject of the preview image and a size of the preview frame when the central point of the subject of the preview image overlaps a central point of the preview frame, the zoom parameter comprising at least one of a to-be-adjusted focal length of a lens of a camera of the electronic device or a zoom factor of the preview image;
zoom the camera according to the zoom parameter;
detect a definition of the preview image;
capture a photograph of the preview image when the definition of the preview image detected meets a preset threshold;
detect whether the photograph of the preview image has perspective distortion;
perform perspective correction on the photograph of the preview image when the photograph of the preview image includes perspective distortion; and
save the photograph of the preview image with the perspective correction.

8. The portable electronic device of claim 7, wherein the instructions further cause the processor to be configured to:
obtain a first characteristic parameter of the preview image;
separately match the first characteristic parameter of the preview image with a second characteristic parameter in at least one preset template that is prestored;
determine that a shape within a first preset template of the at least one preset template is a shape of the subject of the preview image when the first characteristic parameter of the preview image matches the second characteristic parameter in the at least one preset template; and
determine the contour of the subject and the central point of the subject according to the first characteristic parameter of the preview image.

9. The portable electronic device of claim 7, wherein the instructions further cause the processor to be configured to:
obtain a first characteristic parameter of the preview image;
separately match the first characteristic parameter of the preview image with a second characteristic parameter of at least one sub-image block in at least one preset template that is prestored; and
determine that a shape within a first sub-image block of a first preset template of the at least one preset template is a shape of the subject of the preview image when the first characteristic parameter of the preview image matches the second characteristic parameter of the at least one sub-image block, and the first sub-image block being a sub-image block in the at least one sub-image block of the first preset template.

10. The portable electronic device of claim 7, wherein the instructions further cause the processor to be configured to:
display the central point of the subject and the central point of the preview frame in the preview image; and
display prompt information, the prompt information comprising instructions to move the central point of the subject to the central point of the preview frame.

11. The portable electronic device of claim 7, further comprising a detector coupled to the processor, the detector being configured to:
detect whether the preview image is changed;
maintain the zoom parameter of the camera to be unchanged when the preview image is not changed; and
restore the zoom parameter of the camera to an initial value when the preview image is changed.

12. The portable electronic device of claim 8, wherein the shape of the first preset template is a circle, a rectangle, a triangle, a regular polygon, or an irregular polygon.

13. A non-transitory computer readable medium including at least one computer program code stored for automatic zooming on a device associated with a computing device, the program code when executed on a processor, causes the processor to be configured to:
determine a contour of a subject of a preview image in a preview frame on a screen;
determine a central point of the subject of the preview image;
determine a zoom parameter according to a size of the contour of the subject of the preview image and a size of the preview frame when the central point of the subject of the preview image overlaps a central point of the preview frame, the zoom parameter comprising at least one of a to-be-adjusted focal length of a lens of a camera of the device or a zoom factor of the preview image;
zoom the camera according to the zoom parameter;
detect a definition of the preview image;
capture a photograph of the preview image when the definition of the preview image detected meets a preset threshold;
detect whether the photograph of the preview image has perspective distortion;
perform perspective correction on the photograph of the preview image when the photograph of the preview image includes perspective distortion; and
save the photograph of the preview image with perspective correction.

14. The non-transitory computer readable medium of claim 13, wherein the program code further causes the processor to be configured to:
obtain a first characteristic parameter of the preview image;
separately match the first characteristic parameter of the preview image with a second characteristic parameter in at least one preset template that is prestored;
determine that a shape within a first preset template is a shape of the subject of the preview image when the first characteristic parameter of the preview image matches the second characteristic parameter in the at least one preset template; and
determine the contour of the subject and the central point of the subject according to the first characteristic parameter of the preview image.

15. The non-transitory computer readable medium of claim 13, wherein the program code further causes the processor to:
obtain a first characteristic parameter of the preview image;
separately match the first characteristic parameter of the preview image with a second characteristic parameter in at least one sub-image block in at least one preset template stored; and
determine that a shape within a first sub-image block of a first preset template is a shape of the subject of the preview image when the first characteristic parameter of the preview image matches the second characteristic parameter in the at least one sub-image block in the at least one preset template, and the first sub-image block being a sub-image block in the at least one sub-image block of the first preset template.

16. The non-transitory computer readable medium of claim 13, wherein the program code further causes the processor to:
display the central point of the subject and the central point of the preview frame in the preview image; and
display prompt information, the prompt information comprising instructions to move the central point of the subject to the central point of the preview frame.

17. The non-transitory computer readable medium of claim 13, wherein the program code further causes the processor to:
  detect whether the preview image is changed after capturing the photograph of the preview image;
  maintain the zoom parameter of the camera to be unchanged when the preview image is not changed; and
  restore the zoom parameter of the camera to an initial value when the preview image is changed.

18. The method of claim 3, wherein the shape of the first preset template is a circle, a rectangle, a triangle, a regular polygon, or an irregular polygon.

19. The portable electronic device of claim 9, wherein the shape of the first preset template is a circle, a rectangle, a triangle, a regular polygon, or an irregular polygon.

* * * * *